US012647967B2

(12) United States Patent
Rom et al.

(10) Patent No.: US 12,647,967 B2
(45) Date of Patent: Jun. 2, 2026

(54) EARLY UE PANEL SWITCH REPORTING

(71) Applicant: Nokia Technologies OY, Espoo (FI)

(72) Inventors: Christian Rom, Aalborg (DK); Samantha Caporal Del Barrio, Aalborg (DK); Fuad Mousse Abinader Junior, Massy (FR); Sami-Jukka Hakola, Kempele (FI); Matha Deghel, Paris (FR); Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 308 days.

(21) Appl. No.: 18/247,293

(22) PCT Filed: Sep. 23, 2021

(86) PCT No.: PCT/EP2021/076210
§ 371 (c)(1),
(2) Date: Mar. 30, 2023

(87) PCT Pub. No.: WO2022/069341
PCT Pub. Date: Apr. 7, 2022

(65) Prior Publication Data
US 2024/0008031 A1     Jan. 4, 2024

Related U.S. Application Data

(60) Provisional application No. 63/085,761, filed on Sep. 30, 2020.

(51) Int. Cl.
*H04W 72/1263* (2023.01)
*H04W 72/21* (2023.01)
*H04W 72/542* (2023.01)

(52) U.S. Cl.
CPC ....... *H04W 72/1263* (2013.01); *H04W 72/21* (2023.01); *H04W 72/542* (2023.01)

(58) Field of Classification Search
None
See application file for complete search history.

(56) References Cited

U.S. PATENT DOCUMENTS

2010/0014463 A1*  1/2010  Nagai ................ H04B 7/06952
                                                      370/328
2011/0141928 A1*  6/2011  Shin ...................... H04L 5/0053
                                                      370/252

(Continued)

FOREIGN PATENT DOCUMENTS

CN          110637418 A       12/2019
CN          110999395 A        4/2020
WO    WO-2019028836 A1 *  2/2019  ........... H04B 7/0691

OTHER PUBLICATIONS

LG Electronics, "Feature lead summary#3 of Enhancements on Multi-beam Operations," R1-1907860, 3GPP TSG RAN WG1 Meeting #97, May 13-17, 2019.

(Continued)

*Primary Examiner* — Steve R Young
(74) *Attorney, Agent, or Firm* — Lippes Mathias LLP

(57)            ABSTRACT

A user equipment includes a plurality of antenna panels, at least one processor, and at least one memory including computer program code. The at least one memory and the computer program code are configured to, with the at least one processor, cause the user equipment to: identify a potential change in active antenna panel at the user equipment from a first of the plurality of antenna panels to a second of the plurality of antenna panels; and transmit at least one early panel switch detection message indicating the potential change in active antenna panel to a base station serving the user equipment.

18 Claims, 14 Drawing Sheets

(56)                    References Cited

U.S. PATENT DOCUMENTS

| | | | | |
|---|---|---|---|---|
| 2012/0142385 | A1 | 6/2012 | Choi et al. | |
| 2017/0311174 | A1* | 10/2017 | Tidhar | H04B 17/102 |
| 2017/0366996 | A1* | 12/2017 | Park | H04W 72/21 |
| 2018/0343043 | A1 | 11/2018 | Hakola et al. | |
| 2019/0260458 | A1 | 8/2019 | Zhou et al. | |
| 2019/0305813 | A1* | 10/2019 | Zhang | H04B 7/04 |
| 2019/0320336 | A1* | 10/2019 | Takano | H04W 16/28 |
| 2020/0076650 | A1 | 3/2020 | Park et al. | |
| 2020/0145080 | A1 | 5/2020 | Tang et al. | |
| 2020/0169995 | A1 | 5/2020 | Nam et al. | |
| 2020/0178134 | A1 | 6/2020 | Yang et al. | |
| 2021/0337530 | A1* | 10/2021 | Raghavan | H04B 7/06956 |
| 2022/0030479 | A1* | 1/2022 | Jain | H04L 27/2601 |
| 2022/0158716 | A1* | 5/2022 | Tie | H04B 7/0426 |
| 2023/0107768 | A1* | 4/2023 | Chen | H04W 24/02 |
| | | | | 455/68 |
| 2023/0156737 | A1* | 5/2023 | Yao | H04W 74/0808 |
| | | | | 370/329 |
| 2023/0171067 | A1* | 6/2023 | Wang | H04L 5/0096 |
| | | | | 370/329 |

OTHER PUBLICATIONS

Vasanthan Raghavan, et al., "Antenna Placement and Performance Tradeoffs With Hand Blockage in Millimeter Wave Systems," IEEE Transactions on Communications, vol. 67, No. 4, Apr. 2019.
"3rd Generation Partnership Project;Technical Specification Group Radio Access Network;*Study on new radio access technology Physical layer aspects," TR 38.802 TSG RAN WG1*, Sep. 26, 2017.
"3rd Generation Partnership Project; Technical Specification Group Radio Access Network; NR; Physical layer procedures for data," TS 38.214 GPP TSG RAN WG1, Apr. 3, 2020.

"3rd Generation Partnership Project; Technical Specification Group Radio Access Network;NR; NR and NG-RAN Overall Description; Stage 2," 3GPP TS 38.300 V16.3.0, Sep. 2020.
International Search Report for International Application No. PCT/EP2021/076210 dated Jan. 18, 2022.
"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
Office Action received for corresponding Japanese Patent Application No. 2023-519807 dated Apr. 2, 2024, 5 pages of Office Action and 6 pages of Translation & Summary available.
"Enhancement on multi-beam operation", 3GPP TSG RAN WG1 #102-e, R1-2005619, Agenda: 8.1.1, MediaTek Inc, Aug. 17-28, 2020, 7 pages.
"Discussion on multi-beam enhancement", 3GPP TSG RAN WG1 #102-e, R1-2005363, Agenda: 8.1.1, vivo, Aug. 17-28, 2020, 21 pages.
"On Beam Management Enhancement", 3GPP TSG-RAN WG1 Meeting #102-e, R1-2006499, Agenda: 8.1.1, Apple Inc, Aug. 17-28, 2020, 10 pages.
"Discussion on enhancement on multi-beam operation", 3GPP TSG RAN WG1 #102-e, R1-2005683, Agenda: 8.1.1, CATT, Aug. 17-28, 2020, 5 pages.
"Discussion on Enhancements for Multi-beam Operation", 3GPP TSG RAN WG1 #102-e, R1-2006636, Agenda: 8.1.1, Asia Pacific Telecom, Aug. 17-28, 2020, 5 pages.
Office action received for corresponding Chinese Patent Application No. 202180066586.X, dated Jul. 26, 2025, 8 pages of office action and no page of translation available.
Office action received for corresponding European Patent Application No. 21783205.4, dated Sep. 4, 2025, 6 pages.

* cited by examiner

EARLY UE PANEL SWITCH REPORTING

This application is the National Phase under 35 U.S.C. § 371 of PCT Application No. PCT/EP2021/076210, which has an international filing date of Sep. 23, 2021, and which claims priority to provisional U.S. Application No. 63/085,761, filed Sep. 30, 2020, the entire contents of each of which are incorporated herein by reference.

TECHNICAL FIELD

One or more example embodiments relate to wireless communications networks.

BACKGROUND

Fifth generation (5G) wireless communications networks are the next generation of mobile communications networks. Standards for 5G communications networks are currently being developed by the Third Generation Partnership Project (3GPP). These standards are known as 3GPP New Radio (NR) standards.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

One or more example embodiments are based on the Third Generation Partnership Project New Radio (3GPP NR) standards, for example, mmWave bands such as FR2 or frequencies in higher ranges.

In accordance with example embodiments, a user equipment (UE) may provide feedback to a gNB to enable the gNB to determine when to send aperiodic Channel State Information-Reference Symbols (CSI-RS) with repetition on for narrow beam refinement at the UE, thereby reducing overhead of CSI-RS and/or suppressing and/or preventing throughput degradation due to panel switching at the UE.

According to example embodiments, the UE may estimate the likelihood that an active panel will switch as well as approximate timing of the switch based on L1 RSRP measurements in a scan state (during a scan period), such that the decision to switch active panels at the UE is not random from the perspective of the UE and/or the network/gNB.

At least one example embodiment provides a user equipment comprising: a plurality of antenna panels, at least one processor, and at least one memory including computer program code. The at least one memory and the computer program code are configured to, with the at least one processor, cause the user equipment to: identify a potential (or, alternatively, upcoming or future) change in active antenna panel at the user equipment from a first of the plurality of antenna panels to a second of the plurality of antenna panels, and transmit at least one early panel switch detection message indicating the potential change in active antenna panel to a base station serving the user equipment.

At least one example embodiment provides a user equipment comprising: a plurality of antenna panels; means for identifying a potential change in active antenna panel at the user equipment from a first of the plurality of antenna panels to a second of the plurality of antenna panels; and means for transmitting at least one early panel switch detection message indicating the potential change in active antenna panel to a base station serving the user equipment.

At least one example embodiment provides a method comprising: identifying a potential change in active antenna panel at a user equipment from a first of a plurality of antenna panels to a second of the plurality of antenna panels; and transmitting at least one early panel switch detection message indicating the potential change in active antenna panel to a base station serving the user equipment.

At least one other example embodiment provides a non-transitory computer-readable medium including computer-executable instructions that, when executed by at least one processor at a user equipment, cause the user equipment to perform a method comprising: identifying a potential change in active antenna panel at the user equipment from a first of a plurality of antenna panels to a second of the plurality of antenna panels; and transmitting at least one early panel switch detection message indicating the potential change in active antenna panel to a base station serving the user equipment.

According to example embodiments, the at least one memory and the computer program code may be configured to, with the at least one processor, cause the user equipment to switch the active antenna panel from the first of the plurality of antenna panels to the second of the plurality of antenna panels.

The at least one early panel switch detection message includes at least one of: (i) a difference between a first received signal power for the first of the plurality of antenna panels and a second received signal power for the second of the plurality of antenna panels; (ii) an estimated time until the active antenna panel is to switch from the first of the plurality of antenna panels to the second of the plurality of antenna panels; (iii) an indication of a selected downlink reference signals for the second of the plurality of antenna panels; or (iv) an indication of a number of transmit beams for the second of the plurality of antenna panels.

The at least one memory and the computer program code may be configured to, with the at least one processor, cause the user equipment to: estimate, based on a received signal block, a difference between a first received signal power for the first of the plurality of antenna panels and a second received signal power for the second of the plurality of antenna panels; and identify the potential change in active antenna panel at the user equipment based on the estimated difference.

The at least one memory and the computer program code may be configured to, with the at least one processor, cause the user equipment to identify the potential change in active antenna panel at the user equipment in response to the estimated difference being less than a panel switch threshold value.

The at least one memory and the computer program code may be configured to, with the at least one processor, cause the user equipment to: determine that the estimated difference is less than a panel switch threshold value; and calculate a panel switch delay in response to determining that the estimated difference is less than the panel switch threshold value. The at least one early panel switch detection message may include the panel switch delay.

The at least one early panel switch detection message may be transmitted via L1 signaling or L2 signaling.

The at least one early panel switch detection message is at least one Physical Uplink Shared Channel message.

The at least one Physical Uplink Shared Channel message includes at least one of: an Uplink Control Information

3

(UCI) message transmitted via L1 signaling; or a MAC control element transmitted via L2 signaling.

The at least one early panel switch detection message may include an Uplink Control Information (UCI) message transmitted on the Physical Uplink Control Channel via L1 signaling.

The at least one memory and the computer program code may be configured to, with the at least one processor, cause the user equipment to: transmit a scheduling request for transmitting the at least one early panel switch detection message; and transmit the at least one early panel switch detection message in response to a scheduling grant sent in response to the scheduling request.

The at least one memory and the computer program code may be configured to, with the at least one processor, cause the user equipment to periodically transmit the at least one early panel switch detection message, each early panel switch detection message including at least one of: (i) a difference between a first received signal power for the first of the plurality of antenna panels and a second received signal power for the second of the plurality of antenna panels; or (ii) an estimated time until the active antenna panel is to change from the first of the plurality of antenna panels to the second of the plurality of antenna panels.

At least one example embodiment provides a radio access network element comprising at least one processor and at least one memory including computer program code. The at least one memory and the computer program code may be configured to, with the at least one processor, cause the radio access network element to: receive at least one early panel switch detection message indicating a potential upcoming change in active antenna panel at a user equipment from a first antenna panel to a second antenna panel; and transmit a reference signal with repetition to the user equipment based on the received at least one early panel switch detection message.

At least one example embodiment provides a radio access network element comprising: means for receiving at least one early panel switch detection message indicating a potential upcoming change in active antenna panel at a user equipment from a first antenna panel to a second antenna panel; and means for transmitting a reference signal with repetition to the user equipment based on the received at least one early panel switch detection message.

At least one other example embodiment provides a method comprising: receiving at least one early panel switch detection message indicating a potential upcoming change in active antenna panel at a user equipment from a first antenna panel to a second antenna panel; and transmitting a reference signal with repetition to the user equipment based on the received at least one early panel switch detection message.

At least one other example embodiment provides a non-transitory computer-readable storage medium storing computer-executable instructions that, when executed by at least one processor at a radio access network element, cause the radio access network element to perform a method comprising: receiving at least one early panel switch detection message indicating a potential upcoming change in active antenna panel at a user equipment from a first antenna panel to a second antenna panel; and transmitting a reference signal with repetition to the user equipment based on the received at least one early panel switch detection message.

According to example embodiments the at least one early panel switch detection message may include at least one of: (i) a difference between a first received signal power for the first antenna panel and a second received signal power for the second antenna panel; (ii) an estimated time until the active antenna panel is to change from the first antenna panel to the second antenna panel; (iii) an indication of a selected downlink reference signals for the second antenna panel at the radio access network element; or (iv) an indication of a number of transmit beams for the second antenna panel.

The at least one early panel switch detection message may be received via L1 signaling or L2 signaling.

The at least one early panel switch detection message may be at least one of: at least one Uplink Control Information (UCI) message transmitted on a Physical Uplink Shared Channel or the Physical Uplink Control Channel via L1 signaling; or at least one MAC control element transmitted on the Physical Uplink Shared Channel via L2 signaling.

The at least one memory and the computer program code may be configured to, with the at least one processor, cause the radio access network element to transmit a scheduling grant in response to a scheduling request for transmitting the at least one early panel switch detection message.

The at least one memory and the computer program code may be configured to, with the at least one processor, cause the radio access network element to: determine an estimated time at which the active antenna panel is to change from the first antenna panel to the second antenna panel based on the at least one early panel switch detection message; and transmit the reference signal with repetition based on the estimated time.

The at least one early panel switch detection message may include a plurality of early panel switch detection messages. The at least one memory and the computer program code may be configured to, with the at least one processor, cause the radio access network element to determine the estimated time at which the active antenna panel is to change from the first antenna panel to the second antenna panel based on the plurality of early panel switch detection messages.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
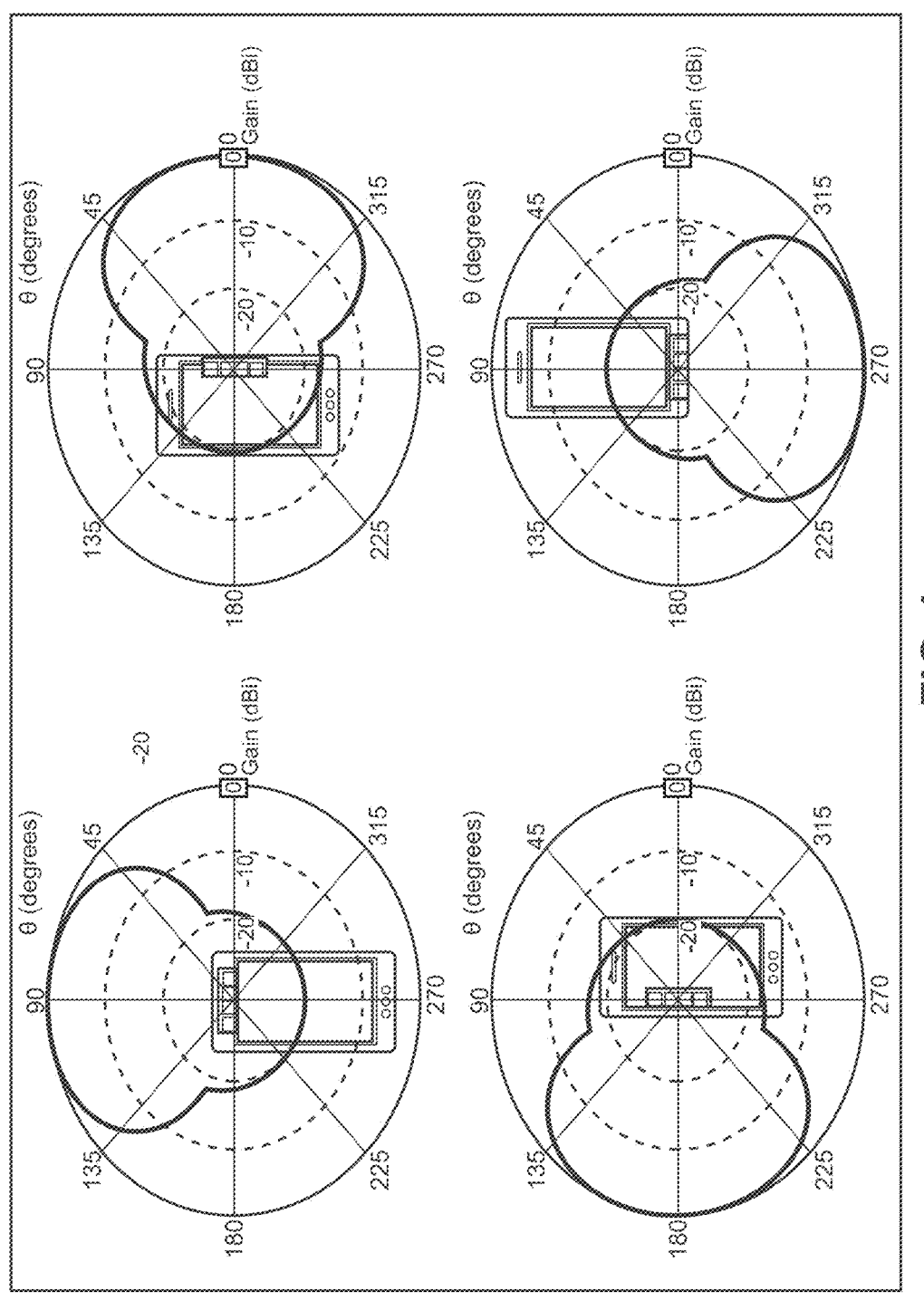
FIG. 1 illustrates an example radiation pattern for a multi-panel user equipment (MPUE) Assumption in which only one panel is active at a time.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio network elements (e.g., gNB), user equipment (UE), or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

As discussed herein the terminology "one or more" and "at least one" may be used interchangeably.

As discussed herein, a gNB may also be referred to as a base station, access point, enhanced NodeB (eNodeB), or more generally, a radio access network element or network node. A UE may also be referred to herein as a mobile station, and may include a mobile phone, a cell phone, a smartphone, a handset, a personal digital assistant (PDA), a tablet, a laptop computer, a phablet, or the like.

It will be appreciated that a number of example embodiments may be used in combination.

In frequency bands, such as millimeter Wave (mmWave) (e.g., FR2) or frequencies in higher ranges, UEs may be equipped with panels of directive antenna arrays supporting beam steering.

Many different types of multi-panel arrangements, positions and orientations have been proposed and studied in the 3rd Generation Partnership Project (3GPP). One example edge design includes three to four panels placed at each edge of a UE, such as a smartphone.

For multi-panel arrangements, the 3GPP has proposed different types of multi-panel UE (MPUE) assumptions that support between only one active panel at a time to all panels being active simultaneously. Specifically, the 3GPP has proposed the following three types of MPUE assumptions:

MPUE-Assumption 1 (MPUE1): Multiple panels are implemented on a UE and only one panel is activated at a time;

MPUE-Assumption 2 (MPUE2): Multiple panels are implemented on a UE, multiple panels may be activated at a time and one or more panels may be used for transmission simultaneously; and MPUE-Assumption 3 (MPUE3): Multiple panels are implemented on a UE, multiple panels may be activated at a time, but only one panel may be used for transmission at a time.

Figure 2:
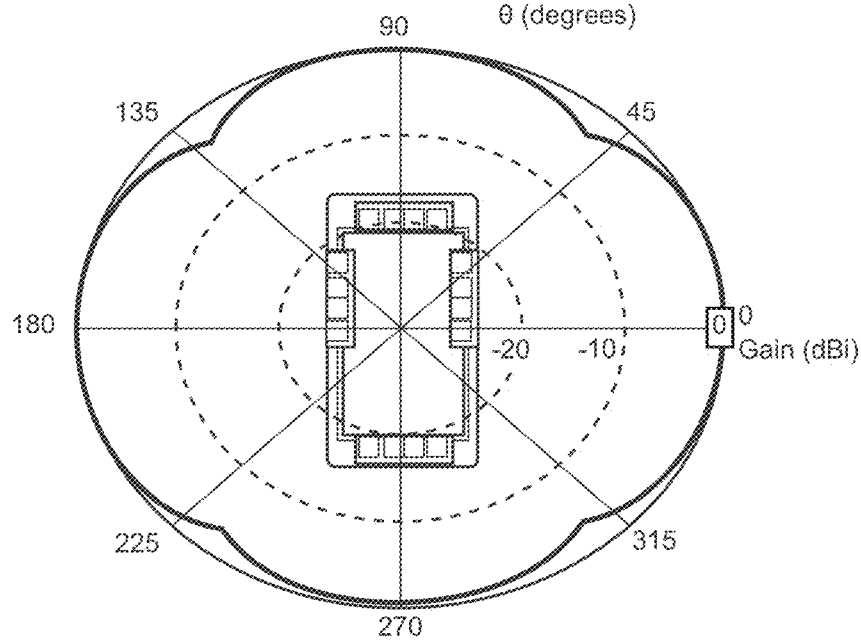
FIG. 2 illustrates example radiation patterns for other MPUE-Assumptions in which multiple panels are active simultaneously.

FIG. 1 illustrates an example radiation pattern for MPUE-Assumption MPUE1 in which only one panel is active at a time. FIG. 2 illustrates example radiation patterns of MPUE-Assumptions MPUE2 and MPUE3, wherein multiple panels are active simultaneously at a given time.

The discussion set forth herein focuses on UEs supporting MPUE-Assumptions MPUE1 and MPUE3, wherein one panel is used for transmission at a time. However, example embodiments should not be limited to only the example embodiments discussed herein.

3GPP standard 3GPP TS 38.300 describes input selection for two states (scan state and active state) of active panel selection at a UE. The panel scan state occurs during SSB Burst reception (scan period) at a UE. The active state occurs during all other reception of control and data channels.

During the scan state (during SSB Burst reception), the UE measures, for each panel, the L1 Reference Signal Received Power (RSRP) for the best beam from the gNB, and compares the measured L1 RSRP for the best beam at each panel to identify the panel with the highest L1 RSRP as the panel for the active state (active panel).

At the gNB/network side, a beam alignment procedure is utilized to obtain full beam gain between the gNB and the designated active panel at the UE. This procedure relies on a 3-step approach, including steps P1, P2 and P3.

Step P1 is based on the periodic SSB Burst transmissions for coarse gNB beams, with a recommended periodicity of about 20 ms.

Step P2 is based on CSI-RS for narrow beam refinement at the gNB.

Step P3 is based on a repeated CSI-RS (CSI-RS with repetition) for narrow beam refinement at the UE.

Figure 3:
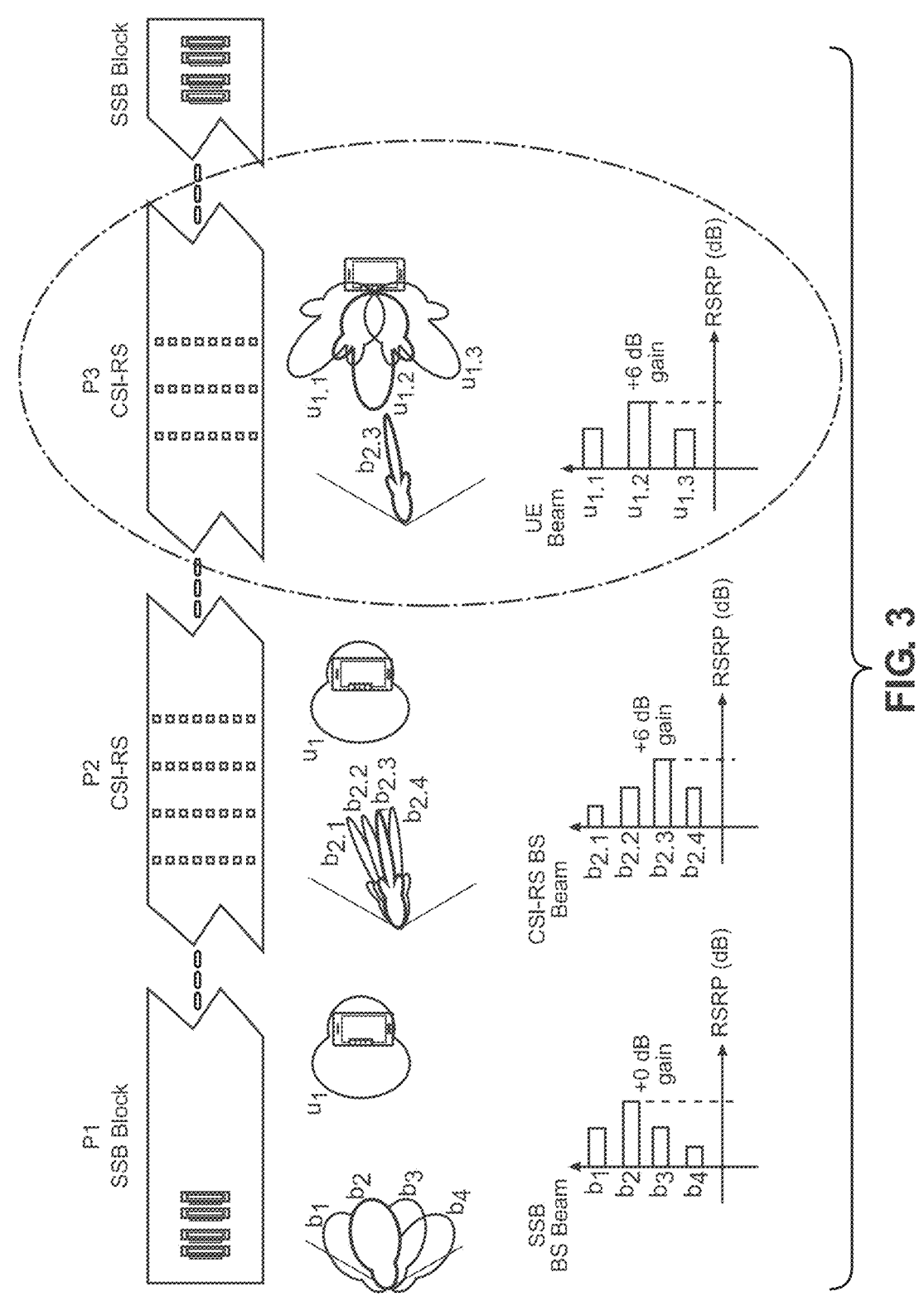
FIG. 3 illustrates example beam alignment procedures.

FIG. 3 illustrates each of steps P1, P2 and P3 along with an associated antenna beam alignment gain for beams b1, b2, b3, b4 at a UE. A prerequisite for the narrow beam sweep (UE receive (RX) beam refinement/training for the panel) at the UE (step P3), is that the UE maintain the same active panel.

In the example shown in FIG. 3, the downlink (DL) L1 RSRP at the UE may experience steps of about 6 dB gain for completed steps P2 and P3 leading to a total of about 12 dB gain.

As mentioned similarly above, during SSB-Burst transmissions, the UE monitors its panels, and activates the panel with the highest L1 RSRP (that is also above an active panel switch threshold) during data transmission for the reception of (e.g., DL) transmissions, such as the Physical Downlink Shared Channel (PDSCH). If the UE detects that a L1 RSRP for an inactive (target) panel is greater than the L1 RSRP for the current active panel (and also above the active panel switch threshold), then the UE makes the target panel the active panel for the next data transmission period.

Figure 4:
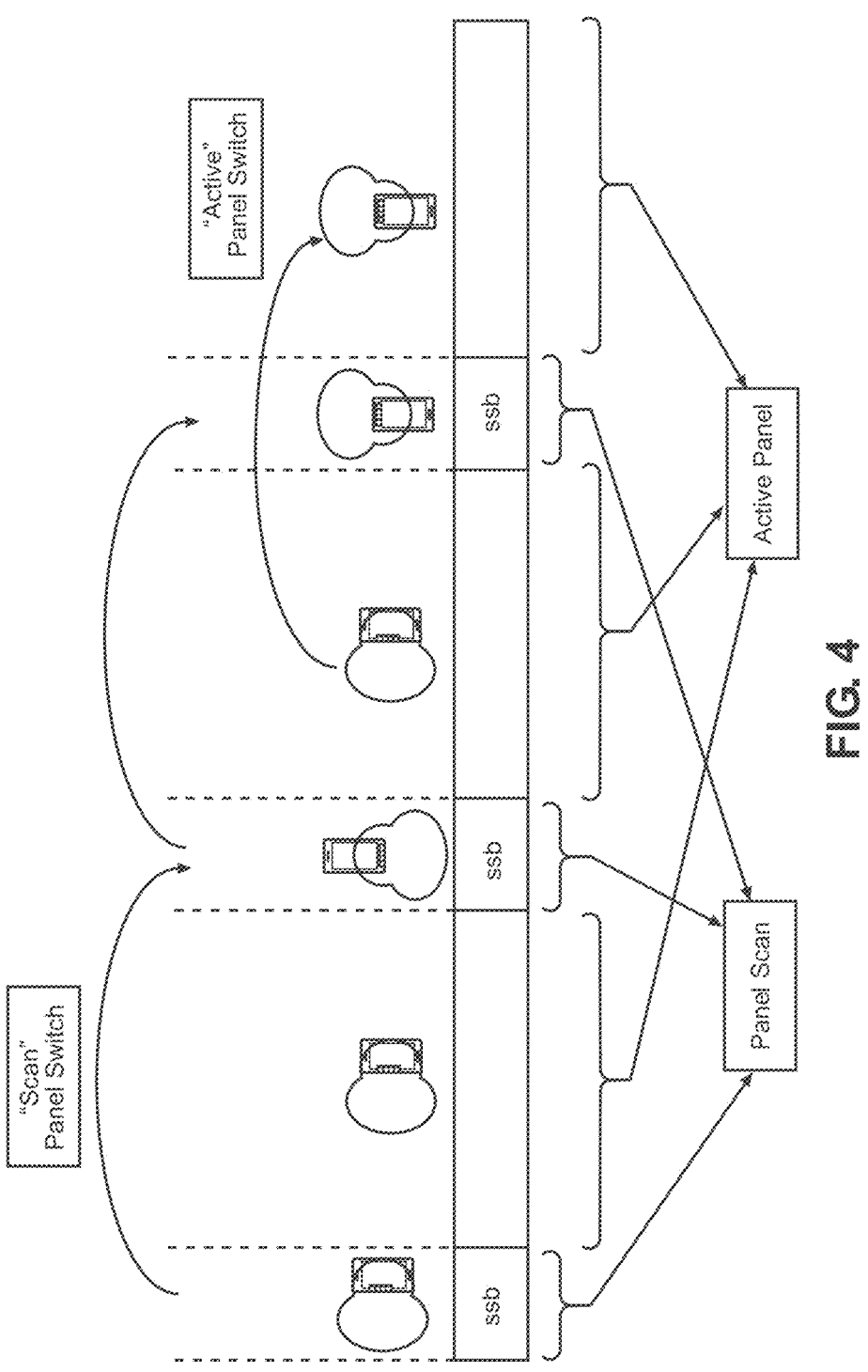
FIG. 4 illustrates an example timing for panel switch control at a UE.

FIG. 4 illustrates an example of this panel switch control timing. In FIG. 4, both a scan state during SSB-Burst and an active state is shown. During the scan state (SSB-Burst), the UE scans for a best panel to designate as the active panel for the active state between SSB-Bursts. In FIG. 4, the UE determines that the best panel has changed based on the third (right-most) SSB-Burst, and thus, a different best panel is designated as the active panel thereafter.

Conventionally, there is no mechanism for the UE to signal to the gNB of an upcoming (potential) switch in the active panel at the UE such that the panel switch is not seen as random (e.g., at the gNB). Rather, the UE either applies a wide low gain beam at the new best active panel, or utilizes a narrow beam sweep with periodic Non-Zero Power Channel State Information Reference Symbols (NZP-CSI-RS) with a periodicity of about 10 ms.

With regard to applying a wide low gain beam for the new best panel, this may lead to a known 6 dB lower performance for a 4-patch array and 9 dB lower performance for an 8-patch array on both the uplink (UL) and DL.

With regard to a narrow beam sweep with periodic NZP-CSI-RS, beam alignment may be relatively slow, and may result in additional overhead. Additionally, even though the UE is configured to decode periodic Tracking Reference Symbols (TRS), where each TRS resource has two symbols, the UE is not expected to perform RX beam refinement from the TRS because the UE needs to update channel estimation filters (e.g., estimate average delay, delay spread, doppler spread, etc.) using the TRS. A numerical example would be a UE with a set of 8 narrow beams and a 3 tap L1 FIR filter would need 8×3=24 samples with about 10 ms separation giving a total of about 240 ms in order to perform a full narrow beam sweep after a panel switch, even without RX beam refinement.

Furthermore, during the UE narrow beam sweep, the data and control messages sent and received are at risk of even further degradation beyond about 6 dB to 9 dB for misaligned narrow UE beams. In this case, the UE may report on different channels (as the beam is changing) and the gNB may wrongly adapt, for example, power control commands and/or modulation schemes.

Figure 5:
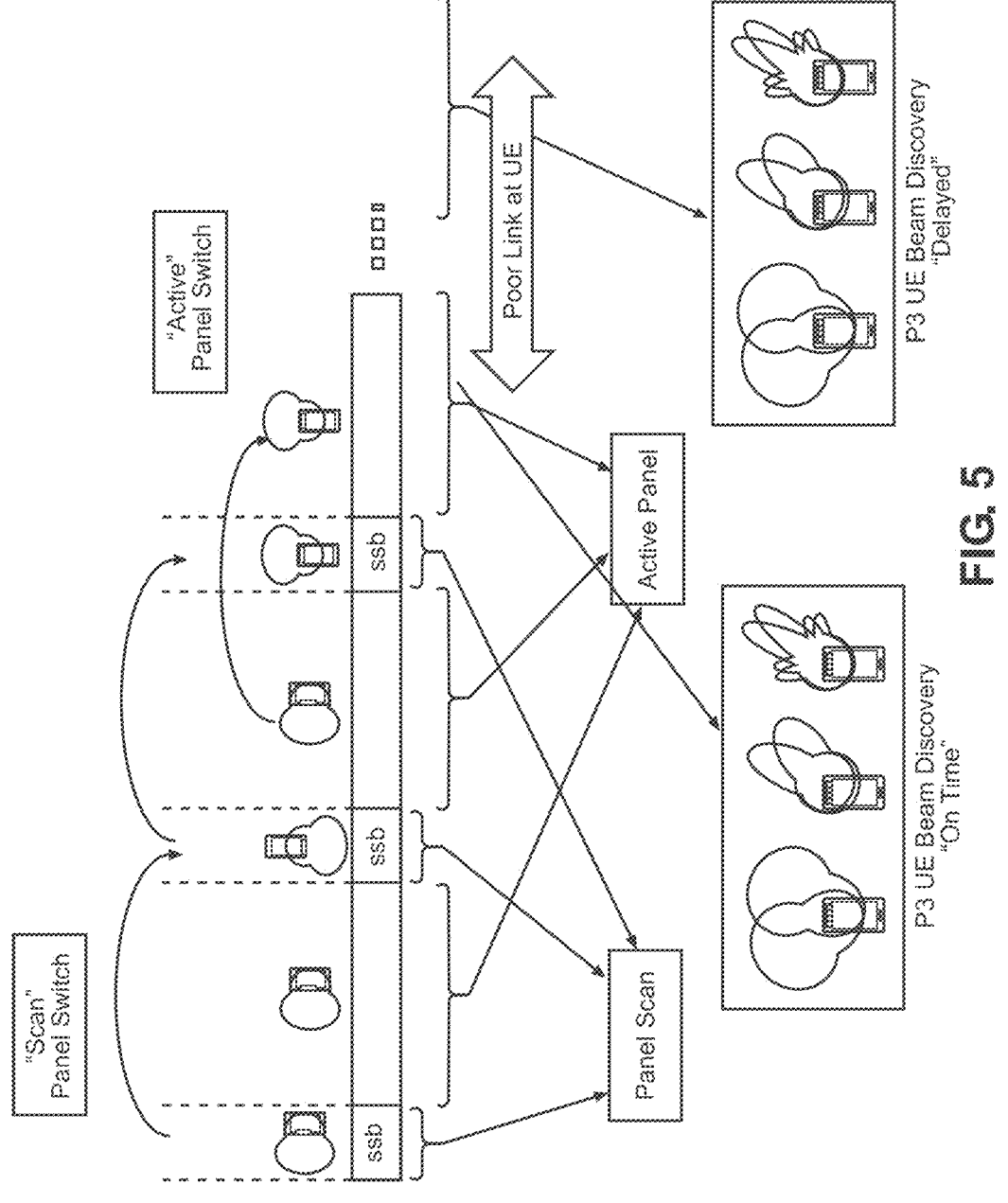
FIG. 5 illustrates an example of delay in beam alignment at the UE.

FIG. 5 illustrates an example case in which the delay in beam alignment at the UE using NZP-CSI-RS may result in a poor link at the UE and degrade performance.

As shown in FIG. 5, if the gNB is informed of a panel switch at the UE after the panel switch is effective, there is a larger period of time with unaligned narrow beams at the UE. From the time the panel switch occurs at the UE until the establishment of the P3 aligned beam, a relatively poor sub-optimal UL beam pattern is used at the UE (e.g., at least 6 dB worse than with an aligned P3 UL beam). This delay may thus degrade throughput and/or performance.

Issues with UE narrow beam alignment may be further increased as more active UEs are switching panels in the same serving cell because, for example, each UE requires NZP-CSI-RS to perform a narrow beam sweep after a panel switch. For mmWave implementations, the gNB panel may only utilize one active beam at a time (e.g., analog beamforming architecture), and thus, CSI-RS resources are time multiplexed, which may create overhead proportional to the number of independent gNB beams serving an increasing number of UEs. The gNB may decide to send additional aperiodic NZP-CSI-RS with "repetition on" to assist the UEs with their narrow beam alignment, but does not have a clear way for prioritizing those UEs more in need of narrow beam alignment, which may further increase the delay of each UE performing an accurate narrow beam sweep, thereby degrading throughput.

Figure 6:
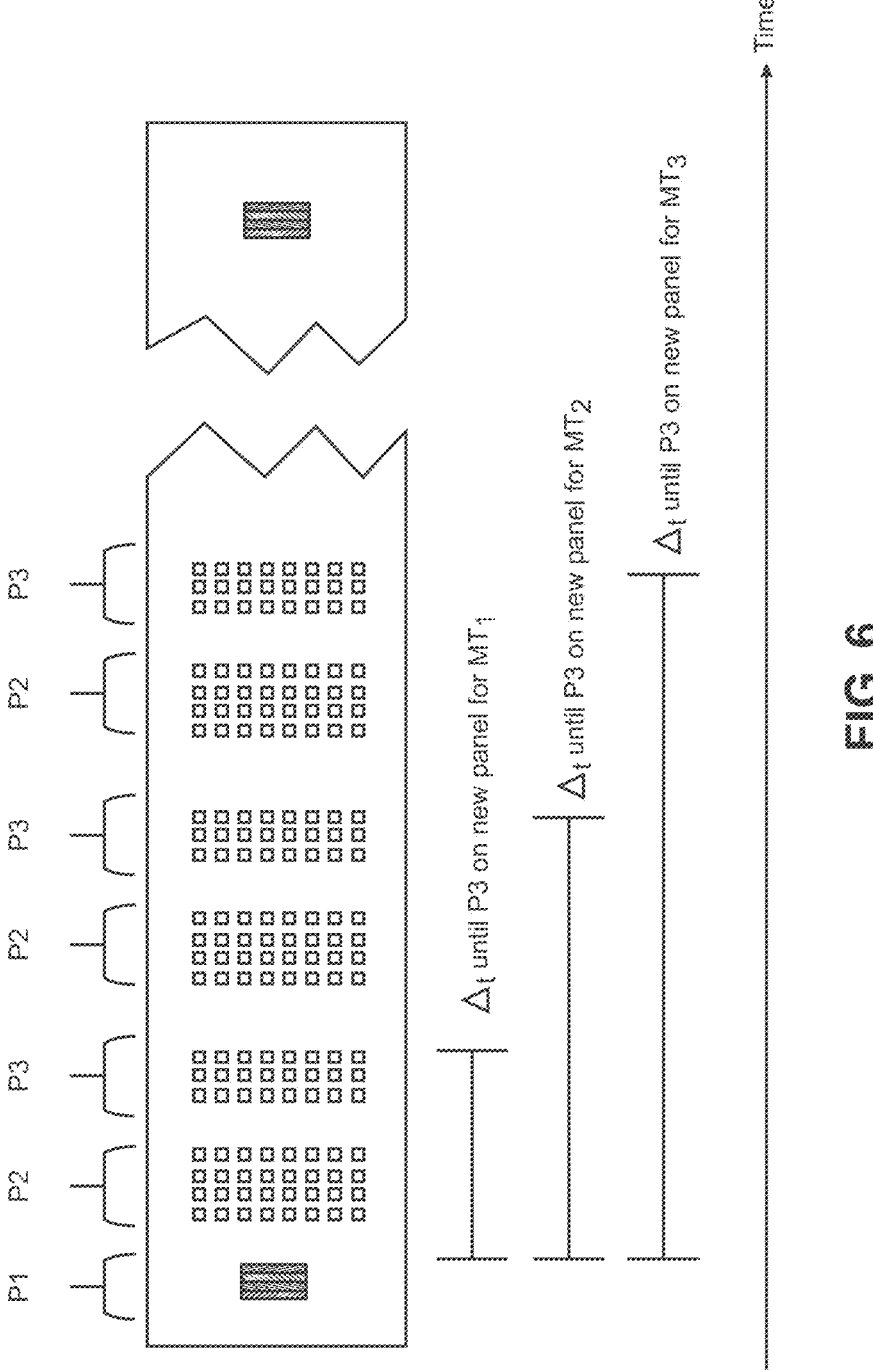
FIG. 6 illustrates an example of multiple UEs sequentially performing sequential narrow beam sweeps.

FIG. 6 illustrates sequential narrow beam sweeps (steps P2 and P3) for multiple UEs $MT_1$, $MT_2$ and $MT_3$ in more detail.

As shown in FIG. 6, the narrow beam sweeps (steps P2 and P3) for the UEs $MT_1$, $MT_2$ and $MT_3$ are performed sequentially. As a result, the time delay $\Delta_t$ for completing the narrow beam sweeps for each of UEs $MT_2$ and $MT_3$ is delayed, which may then delay these UEs from completing P3 beam alignment thereby degrading throughput for each of UEs $MT_2$ and $MT_3$.

Example embodiments provide mechanisms for early detection (pre-detection) of a potential switch in active panels (sometimes referred to as early panel switch detection) at a UE. Once detected, the UE is able to signal this early panel switch detection to the gNB. In response to the early panel detection, the gNB may trigger CSI-RS with repetition for the narrow beam sweep at the appropriate time so as to, for example, suppress throughput degradation at the UE.

Figure 7:
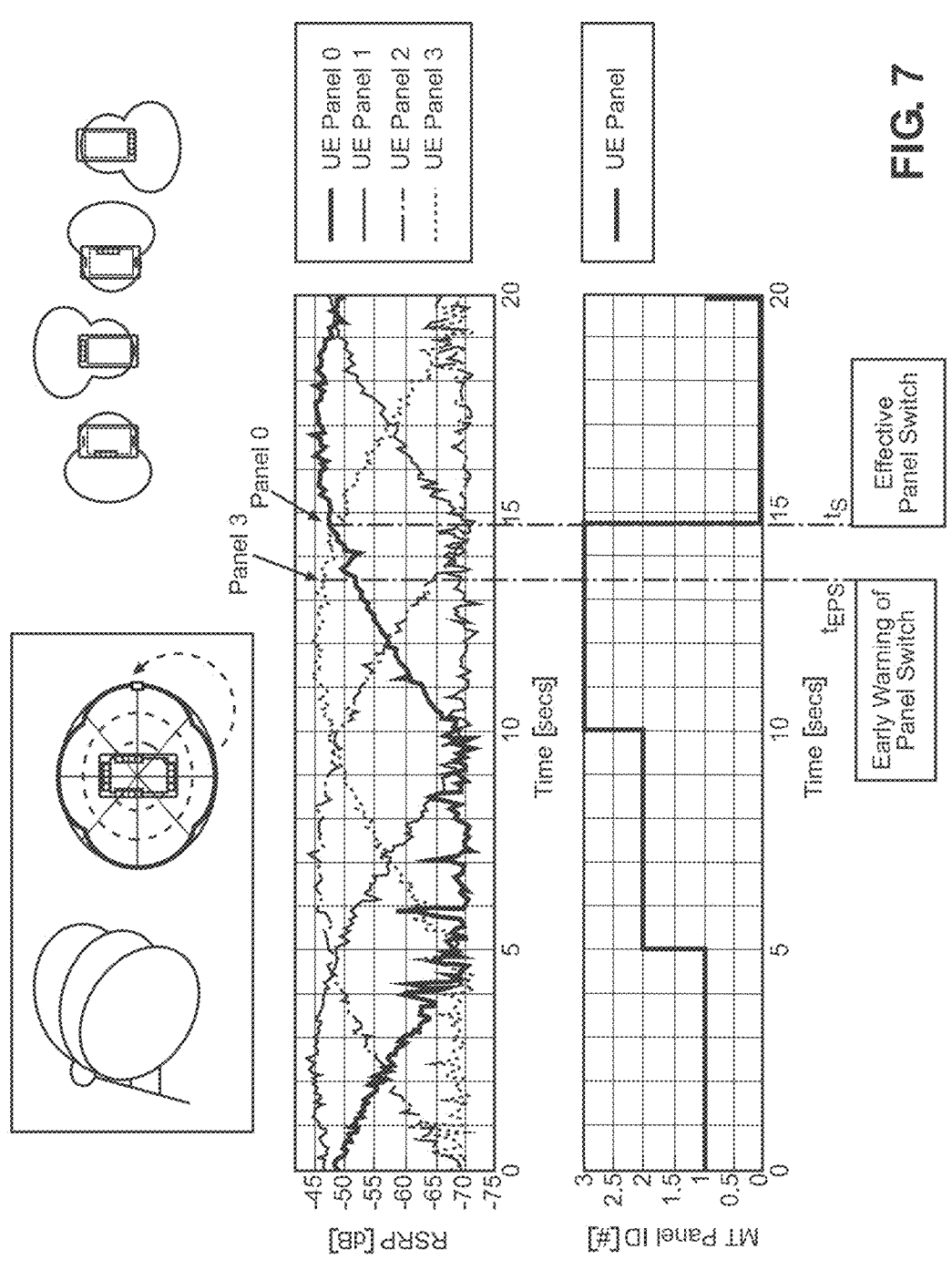
FIG. 7 is a schematic illustration of early panel switch detection and subsequent panel switch at a UE according to example embodiments.

FIG. 7 illustrates an example of early panel switch detection and subsequent panel switch at a UE according to example embodiments.

Referring to FIG. 7, in this example, the current active panel is UE Panel 3 and the target panel is UE Panel 0. As shown, at time $t_{EPS}$ the UE detects a potential panel switch from the UE Panel 3 to UE Panel 0, and reports the potential panel switch to the gNB. Subsequently, at time $t_S$, the UE switches the active panel from UE Panel 3 to UE Panel 0 when the L1-RSRP for UE Panel 0 exceeds the L1-RSRP for UE Panel 3 with a relative gap greater than a panel switch threshold (e.g., about 3 dB). In this instance, the time period between $t_{EPS}$ (early panel detection) and time $t_S$ (panel switch) is about 2.5 seconds.

Figure 12:
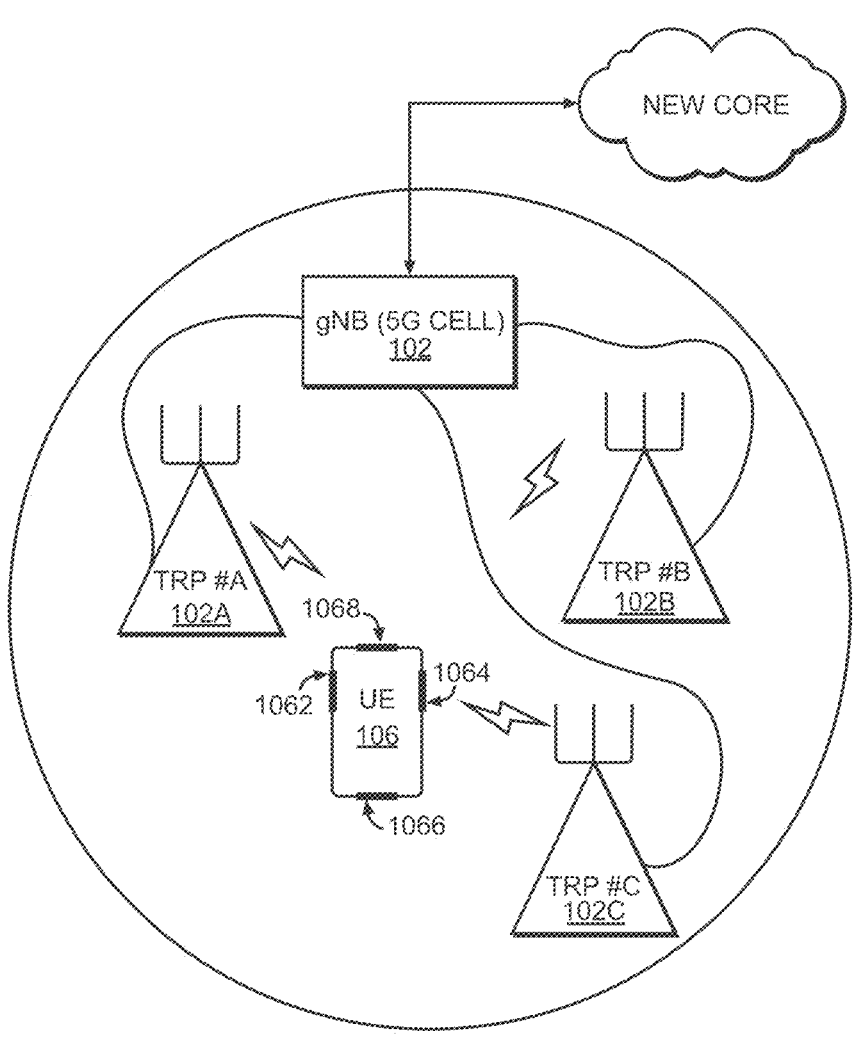
FIG. 12 illustrates a simplified diagram of a portion of a 3rd Generation Partnership Project (3GPP) New Radio (NR) access deployment for explaining example embodiments.

FIG. 12 illustrates a simplified diagram of a portion of a 3rd Generation Partnership Project (3GPP) New Radio (NR) access deployment for explaining example embodiments in more detail.

Referring to FIG. 12, the 3GPP NR radio access deployment includes a gNB 102 having transmission and reception points (TRPs) 102A, 102B, 102C. Each TRP 102A, 102B, 102C may be, for example, a remote radio head (RRH) or remote radio unit (RRU) including at least, for example, a radio frequency (RF) antenna (or antennas) or antenna panels, and a radio transceiver, for transmitting and receiving data within a geographical area. In this regard, the TRPs 102A, 102B, 102C provide cellular resources for user equipment (UEs) (e.g., UE 106) within a geographical coverage area. In some cases, baseband processing may be divided between the TRPs 102A, 102B, 102C and gNB 102 in a 5th Generation (5G) cell. Alternatively, the baseband processing may be performed at the gNB 102. In the example shown in FIG. 12, the TRPs 102A, 102B, 102C are configured to communicate with UE 106 via one or more transmit (TX)/ receive (RX) beam pairs. The gNB 102 communicates with the core network, which is referred to as the New Core in 3GPP NR.

The TRPs 102A, 102B, 102C may have independent schedulers, or the gNB 102 may perform joint scheduling among the TRPs 102A, 102B, 102C.

Although only a single UE 106 is shown in FIG. 12, the gNB 102 and TRPs 102A, 102B, 102C may provide communication services to a relatively large number of UEs within the coverage area of the TRPs 102A, 102B, 102C. For the sake of clarity of example embodiments, communication services (including transmitting and receiving wireless signals) will be discussed as between the gNB 102 and the UE 106. It should be understood, however, that signals may be transmitted between the UE 106 and one or more of the TRPs 102A, 102B, 102C.

The UE 106 includes a plurality of panels 1062, 1064, 1066 and 1068 for transmitting and receiving data to and from the gNB 102 on the UL and DL. Although only four antenna panels are shown in FIG. 12, example embodiments should not be limited to this example. Example functionality and operation of the UE 106 will be discussed in more detail below.

For the following discussion, it is assumed that only one of the plurality of panels 1062, 1064, 1066 and 1068 is active at a time for reception of DL transmission (e.g., a Physical Downlink Shared Channel (PDSCH)) at the UE 106. The active panel is also considered the current best panel (panel with the beam having the highest L1 RSRP measured during the most recent SSB-Burst). However, example embodiments should not be limited to this example. Additionally, although example embodiments may be discussed with regard to DL transmissions, example embodiments should not be limited to this example. Rather, example embodiments may be equally applicable to UL transmissions from UE 106 to gNB 102.

In the scan state (during SSB-Burst reception), the UE 106 measures, for each panel, the L1 RSRP for the best beam from the gNB 102. The UE 106 then performs early panel switch detection based on (e.g., a comparison between) the highest measured L1 RSRP for each panel. Once the UE 106 determines that the measured L1 RSRP for a target panel exceeds the measured L1 RSRP for the current active panel (e.g., based on the comparison of measured L1 RSRP for each panel obtained in a subsequent scan state), the UE 106 switches the active panel (e.g., to make the target panel the active panel) to communicate with the gNB 102.

The UE 106 may perform early panel switch detection by detecting when a difference between the highest L1 RSRP (for the active panel) and the next highest L1 RSRP (for an inactive or target panel) falls below a threshold for early panel switch detection at the UE. As discussed herein, the difference between the highest L1 RSRP (for the active panel) and the next highest L1 RSRP may be referred to as a panel switch gap (PSG). The threshold for early panel switch detection at the UE 106 may be referred to herein as a PSG threshold, and may be implementation specific or configured by the network or a network operator (e.g., based on empirical evidence and/or data).

Upon detecting a potential upcoming panel switch at the UE 106, the UE 106 may send (or signal) one or more upcoming panel switch notification messages to the gNB 102.

In one example, an upcoming panel switch notification message may include, among other things, the PSG (sometimes referred to herein as the PSG approach). In another example, an upcoming panel switch notification message may include, among other things, a time-to-switch-panel (TTSP) indicating an estimated time at which the UE may switch active panels (sometimes referred to herein as the TTSP approach). This estimate may be in the form of an indication of a number of subframes before the panel switch is to occur. Example formats of an upcoming panel switch notification message will be discussed later.

In one example, the upcoming panel switch notification message (signaling) may be sent periodically (e.g., only) after the PSG falls below the PSG threshold. In this case, the UE may provide multiple/repetitive (e.g., periodic) upcoming panel switch notification messages, each including an updated PSG and/or TTSP, beginning after the PSG falls below the PSG threshold. The gNB 102 may then determine when to expect panel switching to occur (panel switch timing) based on the information included in the upcoming panel switch notification message from the UE 106.

The gNB 102 may estimate panel switch timing in any suitable manner, which may be implementation specific. For example, the size of the PSG included in the upcoming panel switch notification message may indicate that the switch between active panels is imminent, and the gNB 102 may utilize a linear interpolation with an extrapolation to intelligence built in the gNB 102 with some predictive filter (Kalman), artificial intelligence (AI), or other known methods, to estimate the panel switch timing.

The gNB 102 may then send CSI-RS with repetition for narrow beam alignment of the new active panel at the UE 106 based on the time at which the panel switching is expected to occur.

In another example, the UE 106 may send a single upcoming panel switch notification message including the PSG and/or the TTSP. In this example, the gNB 102 may determine when to expect the panel switch at the UE 106 based on the upcoming panel switch notification message. In this case, the gNB 102 may also send CSI-RS with repetition for narrow beam alignment of the new active panel at the UE 106 based on the time at which the panel switching is expected to occur.

The upcoming panel switch notification messages may further include a preferred TX beam from the gNB 102, if the preferred TX beam differs from the current serving beam for the UE 106, a number of receive RX beams for the newly active panel and/or a number of repetitions needed to perform alignment (depending on which panel the UE is switching to). The gNB 102 may take this additional information into account in subsequent actions such as the aperiodic UE narrow beam refinement (step P3 discussed above). In providing the preferred TX beam from the gNB 102, the UE 106 may determine whether to include the preferred TX beam based on a network configured threshold or based on specification. In one example, the configured threshold may be about 1, 2 or 3 dB.

The dynamic indication of number of RX beams for the new active panel from the UE 106 may allow gNB 102 to improve and/or optimize the number of repetitions of the CSI-RS for the UE 106. It should be noted that panels at a UE need not all be the same size and have the same number of supported beams. Rather, UEs may be equipped with different panel sizes and correspondingly different number of supported beams.

At the network-side, as mentioned similarly above, the gNB 102 estimates when the potential panel switch may occur at the UE 106 based on the one or more upcoming panel switch notification messages, and then sends the CSI-RS with repetition for narrow beam refinement at the UE 106 at the appropriate time based on the estimated time at which the potential panel switch may occur. The gNB 102 may send the CSI-RS repetition after the panel switch occurs at the UE 106. In one example, the gNB 102 may have built-in intelligence that utilizes the feedback from UE 106 to estimate the proper timing of the CSI-RS repetition. In this regard, the gNB 102 may estimate the proper timing for the CSI-RS repetition in any suitable manner.

Methods for early panel switch detection and narrow beam refinement will now be discussed in more detail with regard to FIGS. 8A, 8B and 9.

Figure 8A:
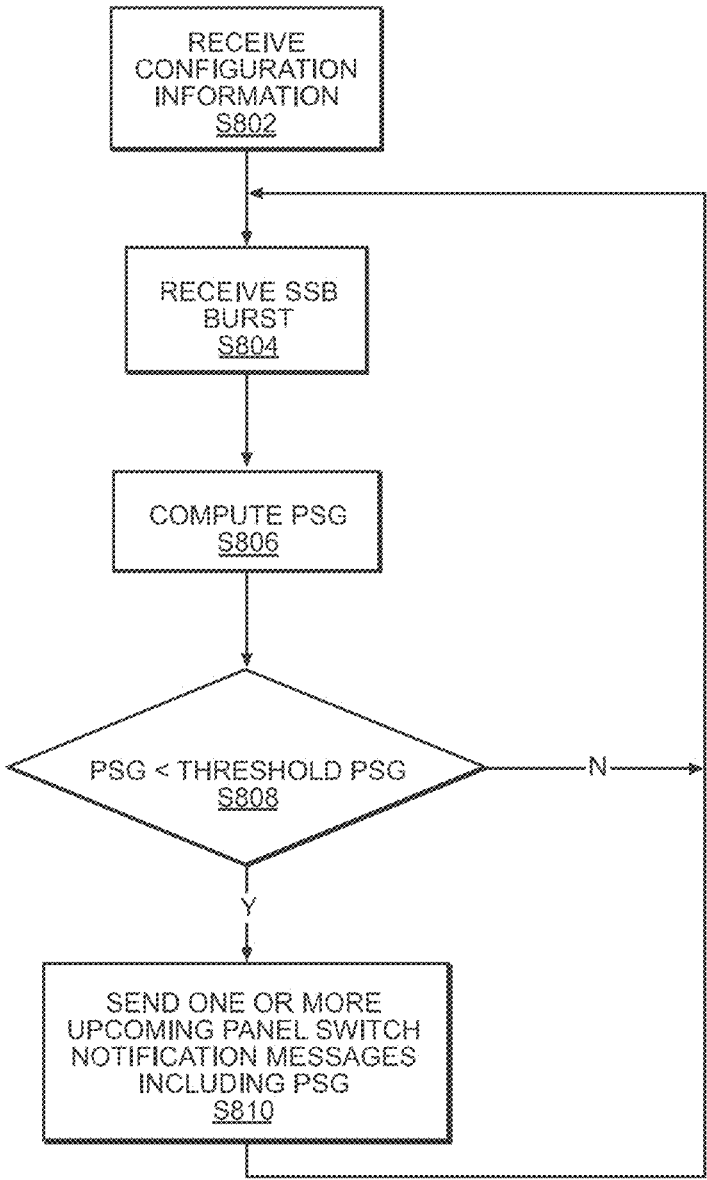
FIG. 8A is a flow chart illustrating a method according to example embodiments.

FIG. 8A is a flow chart illustrating a method for early panel switch detection at a UE according to example embodiments. For example purposes, the example embodiment shown in FIG. 8A will be discussed with regard to the 3GPP NR deployment shown in FIG. 12. However, example embodiments should not be limited to this example.

Referring to FIG. 8A, at S802, the UE 106 receives configuration information regarding early panel switch detection and reporting from the gNB 102. According to example embodiments, the configuration information may include a reporting type (e.g., aperiodic, periodic, etc.) as well as the type of thresholds and values and the type of data to be reported (e.g., dB, subframe offset, both, or the like). In one example, the configuration information may be sent from the gNB 102 to the UE 106 via Radio Resource Control (RRC) signaling.

With regard to RRC signaling, the configuration information may be sent using a structure similar to CSI reporting. In one example, the gNB 102 may configure the reporting type (e.g., aperiodic, periodic, etc.) as well as configure the type of thresholds and values and the type of data to be reported (e.g., dB, subframe offset, both, or the like).

An example structure for an RRC message including configuration information is shown below. In this example, the type of data to be reported includes both dB and subframe offset information.

Example embodiments should not be limited to the above-discussed example RRC message.

Still referring to FIG. 8A, in response to receiving a SSB Burst in the scan state at step S804, the UE 106 computes (or estimates) the PSG between the current active panel (with the beam having the highest L1 RSRP) and the panel having the next highest L1-RSRP at step S806. As discussed above, the PSG (also referred to as the Delta Panel RSRP gap) is the difference between the L1 RSRP of the best (active) panel and the L1 RSRP of the second strongest panel at the UE 106.

At step S808, the UE 106 determines whether the PSG is less than a PSG threshold by comparing the PSG with the PSG threshold. In one example, the PSG threshold may be about 5 dB, and may be configured by the network or a network operator based on empirical evidence.

If the UE 106 determines that the PSG is not less than the PSG threshold (PSG≥PSG threshold), then the process returns to step S804 and the UE 106 awaits the next SSB Burst.

Returning to step S808, if the PSG is less than the PSG threshold (the PSG<PSG threshold), then at step S810 the UE 106 sends one or more upcoming panel switch notification messages (also referred to as early panel switch detection messages or indications) to the gNB 102. The process then returns to step S804 and awaits the next SSB Burst from the gNB 102.

As discussed similarly above, at step S810 the UE 106 may send the one or more upcoming panel switch notification messages periodically after the PSG falls below the PSG threshold. In this case, the UE 106 may provide multiple/repetitive (e.g., periodic) upcoming panel switch notification messages, each including an updated PSG, beginning after the PSG falls below the PSG threshold. In another example, the UE 106 may send a single upcoming panel switch notification message to the gNB 102 after detecting that the PSG is below the PSG threshold.

```
EPS-ReportConfig ::= SEQUENCE {
    reportConfigId                    EPS-ReportConfigId,
    carrier                           ServCellIndex OPTIONAL,
    resourcesForChannelMeasurement        EPS-ResourceConfigId,
    reportConfigType                  CHOICE {
        periodic SEQUENCE {           EPS-ReportPeriodicityAndOffset,
            reportSlotConfig
        },
        semiPersistentOnPUCCH SEQUENCE {
            reportSlotConfig          EPS-ReportPeriodicityAndOffset,
        },
        semiPersistentOnPUSCH SEQUENCE {
            reportSlotConfig          ENUMERATED {sl5, sl10, sl20, sl40, sl80, sl160, sl320},
            reportSlotOffsetList          SEQUENCE (SIZE (1.. maxNrofUL-Allocations))
OF INTEGER(0..32),
        },
        aperiodic SEQUENCE {
            reportSlotOffsetList          SEQUENCE (SIZE (1..maxNrofUL-Allocations))
OF INTEGER(0..32)
        }
    },
    reportQuantity CHOICE {
none                              NULL,
dBvalue                           NULL,
slotoffsetvalue                   NULL,
    },
}
```

Figure 8B:
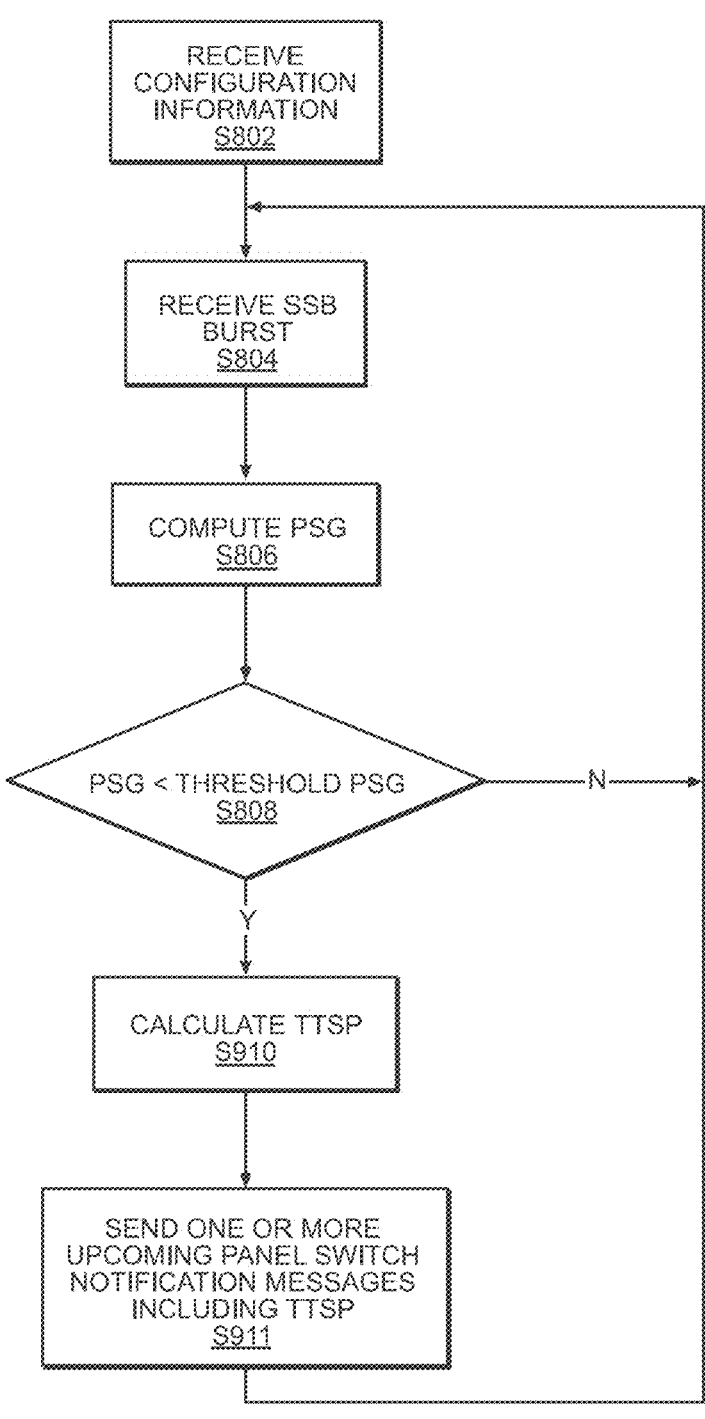
FIG. 8B is a flow chart illustrating another method according to example embodiments.

FIG. 8B is a flow chart illustrating another method for early panel switch detection at a UE according to example embodiments. For example purposes, as with FIG. 8A, the example embodiment shown in FIG. 8B will be discussed with regard to the 3GPP NR deployment shown in FIG. 12. However, example embodiments should not be limited to this example.

Referring to FIG. 8B, each of steps S802, S804, S806 and S808 are the same as that discussed above with regard to FIG. 8A. Thus, a detailed discussion will be omitted here.

According to at least the example embodiment shown in FIG. 8B, once having determined that the PSG is less than the PSG threshold, at step S910 the UE 106 calculates the time to switch estimate (TTSP) (also referred to herein as the panel switch delay) for the potential upcoming panel switch at the UE 106.

In one example, referring back to FIG. 7, for example, the UE 106 may calculate the TTSP by predicting the point in time at which the slope of the L1-RSRP for the new best panel (e.g., Panel 0 in FIG. 7) will cross the L1-RSRP of the current best panel (e.g., Panel 3 in FIG. 7), including a panel switch threshold. This prediction by the UE 106 may be based on signal processing for slope crossing prediction.

In one example, the TTSP may be in the form of a number of subframes until the potential panel switch is to occur at the UE 106.

At step S911, the UE 106 sends one or more upcoming panel switch notification messages to the gNB 102. The UE 106 may send the one or more upcoming panel switch notification messages to the gNB 102 in the same or substantially the same manner as discussed above with regard to step S810 in FIG. 8A, except that the upcoming panel notification message includes the TTSP (e.g., in addition to the PSG).

The process then returns to step S804 and continues as discussed above.

Although not shown in FIG. 8B, the UE 106 may track the TTSP and include a decreasing countdown of panel switch delay in one or more panel switch notification messages sent periodically to the gNB 102.

According to one or more example embodiments, the UE 106 may send the one or more upcoming panel switch notification messages (e.g., including the PSG and/or TTSP) to the gNB 102 via L1 signaling or L2 signaling. In one example, the early panel switch notification messages may be communicated using dedicated/shared periodic (or semi-persistent) Physical Uplink Control Channel (PUCCH) resources. In another example embodiment, the early panel switch notification messages may be communicated using periodic PUSCH resources such as conditional grant (CG) resources, in the form of Uplink Control Information (UCI) on PUSCH resources, or UL MAC control elements (CEs) transmitted via PUSCH resources.

The above-mentioned information elements or structure may be signaled using L1 signaling on dedicated/shared (or semi-persistent) PUCCH resources or part of UCI multiplexed on the PUSCH. If the UE 106 does not have PUCCH or PUSCH resource(s) for the signaling of the information elements, then the UE 106 may initiate a procedure to request PUSCH resources either using a scheduling request (SR) or a RACH procedure as discussed in more detail later. According to at least one example embodiment, the UE 106 may configure specific SR resources for an upcoming panel switch notification message as needed.

With regard to L2 signaling, the payload of an upcoming panel switch notification message may be a 2-field container designed to include the PSG (e.g., up to 3 bits to indicate a value between 0 dB and 3 dB with a 0.5 dB granularity) and the slot_offset/subframe_offset (e.g., up to 3 bits to indicate a value between s15 and s140). The device ID (e.g., Cell-Radio Network Temporary Identifier (C-RNTI) to identify the device uniquely) may be implicit (by having dedicated uplink resources to carry the signaling/indication) or included in the payload.

As mentioned above, an upcoming panel switch notification message may be a MAC CE. In this example, the reserved bits may indicate that the payload contains PSG or slot_offset/subframe_offset values or both. The time stamp may be given in frame number offset, subframe number offset or slot offset. The upcoming panel switch notification message may also include a power value for reference (e.g., L1-SINR or RSRP). Although discussed separately, any combination of the above is also possible depending on the reporting configuration and the C-RNTI may also be part of the payload.

Figure 10:
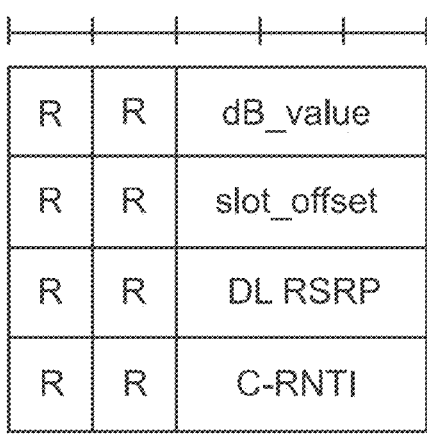
FIG. 10 is an example message structure for an upcoming panel switch notification message according to example embodiments.

FIG. 10 is an example message structure for an upcoming panel switch notification message according to example embodiments.

In more detail, FIG. 10 illustrates an example MAC CE message structure including the PSG (dB_value), the slot offset (slot_offset), the DL RSRP and the C-RNTI.

In more predictable scenarios, the UE 106 may also send a vector of values as an upcoming panel switch notification message. In this case, the UE 106 may send the vector in a MAC CE container.

Figure 11:
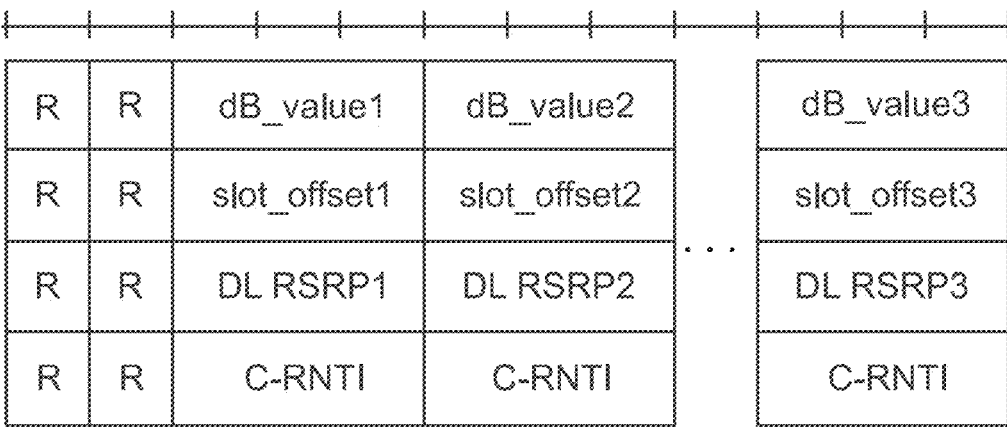
FIG. 11 is an example message structure including a vector of values in a Media Access Control (MAC) control element (MAC CE) container according to example embodiments.

FIG. 11 is an example message structure including a vector of values in a MAC CE container.

Referring to FIG. 11, the payload of the MAC CE container may include a vector of PSG values (dB_value1, dB_value2, . . . dB_value3), a vector of slot offsets (slot_offset1, slot_offset2, . . . , slot_offset3), a vector of RSRP values (DL RSRP1, DL RSRP2, . . . , DL RSRP3), and a device ID (C-RNTI). For an upcoming panel switch notification message including a TTSP, the values may be associated with a time index (e.g., slot offset). Although discussed with regard to device ID, example embodiments may also incorporate a panel ID (e.g., in place of the device ID).

Still referring to the L2 signaling example, if no scheduling grant is provided to transmit the upcoming panel switch notification message to the gNB 102, then the UE 106 may send a SR indicating that the UE 106 has data (e.g., PSG and/or TTSP) to transmit and send via L2 signaling. The gNB 102 may output a scheduling grant to the UE 106 for transmitting the upcoming panel switch notification message. The UE 106 may then transmit the upcoming panel switch notification message on the scheduled resources. A SR is transmitted on PHY speed, which may be beneficial if the UE 106 is, for example, rotating or if the channel is changing (e.g., very rapidly). As an alternative, the UE 106 may transmit the upcoming panel switch notification message on the PUCCH with format 2, 3 and 4 so as not to be bit-limited.

In yet another example, the UE 106 may transmit an upcoming panel switch notification message as the payload of a RACH message. In one example, the UE 106 may send an upcoming panel switch notification message as the payload of Msg 3 in the 4 step RACH approach and on the PUSCH of Msg A in the 2-step RACH approach. Because the 4 step and 2 step RACH approaches are generally known, only a brief discussion will be provided.

Figure 14:
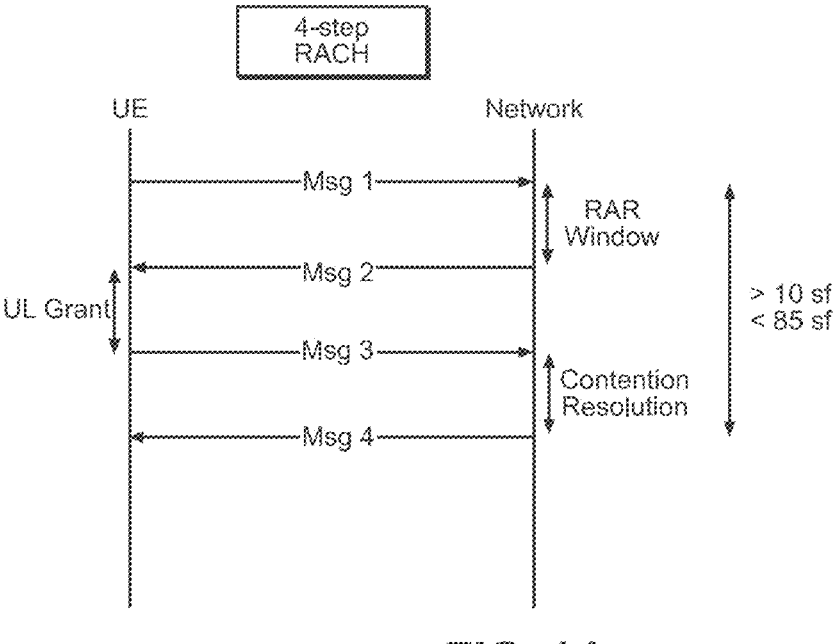
FIG. 14 is a signal flow diagram illustrating the 4 step RACH approach according to example embodiments.

FIG. 14 is a signal flow diagram illustrating the 4 step RACH approach according to example embodiments. FIG.

15 is a signal flow diagram illustrating the 2 step RACH approach according to example embodiments.

Referring to FIG. 14, as shown, Msg 3 including an upcoming panel switch notification message is transmitted during contention resolution in the 4 step RACH approach.

Figure 15:
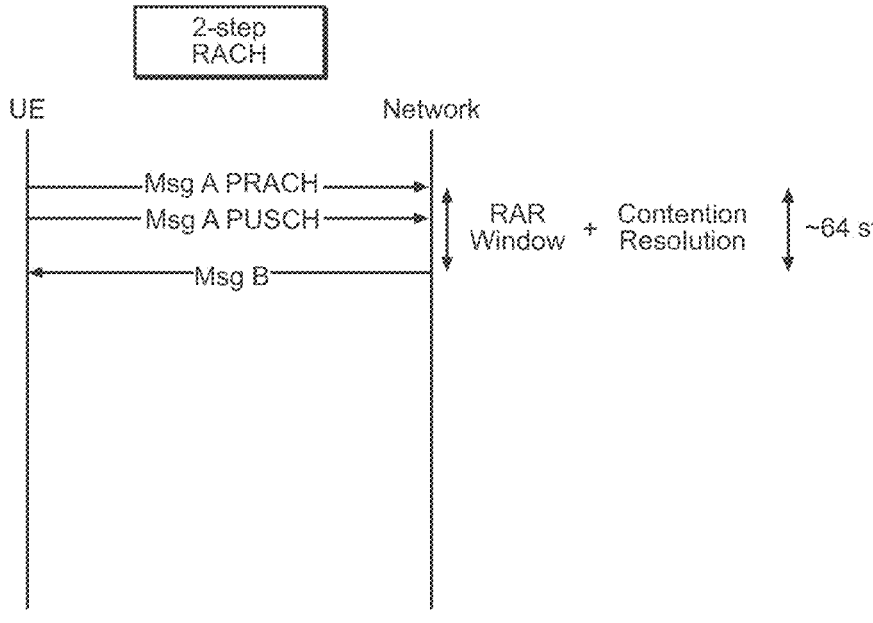
FIG. 15 is a signal flow diagram illustrating the 2 step RACH approach according to example embodiments.

Referring to FIG. 15, as shown, Msg A on the PUSCH including an upcoming panel switch notification message is transmitted during the RAR window and contention resolution in the 2 step RACH approach.

Example operation of the gNB 102 in accordance with example embodiments will now be described with regard to FIG. 9.

Figure 9:
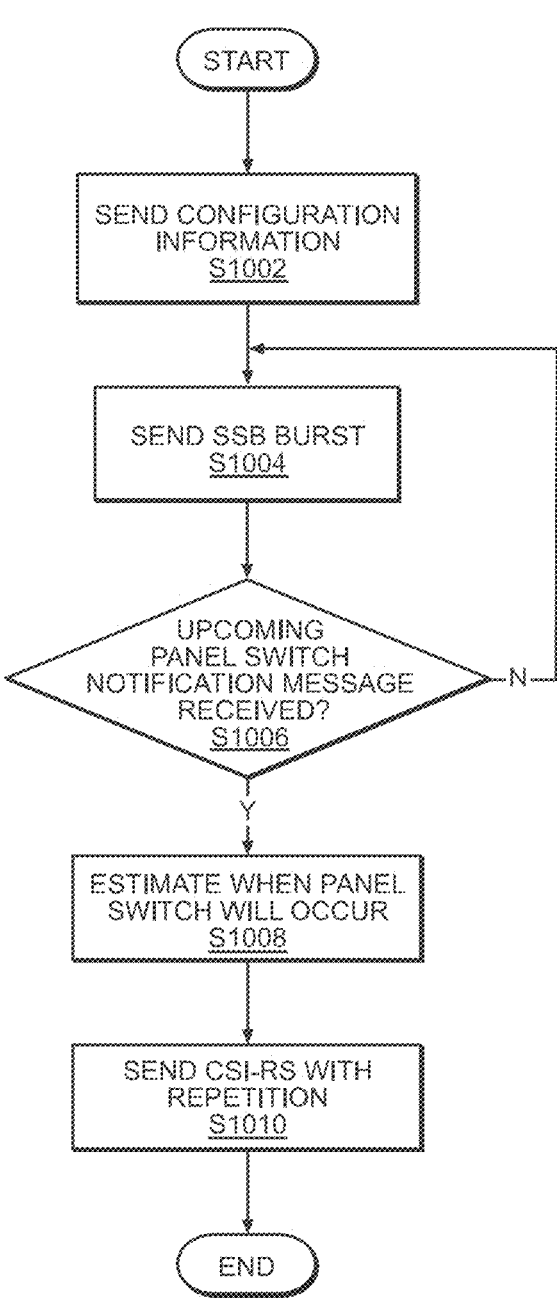
FIG. 9 is a flow chart illustrating yet another method according to example embodiments.

FIG. 9 illustrates a method for narrow beam alignment in response to early panel switch detection at the UE according to example embodiments. For example purposes, the example embodiment shown in FIG. 9 will be discussed with regard to the 3GPP NR deployment shown in FIG. 12. However, example embodiments should not be limited to this example.

Referring to FIG. 9, at step S1002, the gNB 102 sends the configuration information to the UE 106. The configuration information is the same as that discussed above with regard to step S802 in FIGS. 8A and 8B.

At step S1004, the gNB 102 sends a SSB Burst to the UE 106.

At step S1006, the gNB 102 determines whether at least one upcoming panel switch notification message has been received from the UE 106 in response to the SSB Burst sent at step S1004.

If at least one upcoming panel switch notification message has not been received from the UE 106, then the process returns to step S1004 and the gNB 102 awaits the next scan state to output the next SSB Burst.

Returning to step S1006, if the gNB 102 has received at least one upcoming panel switch notification message, then at step S1008 the gNB 102 estimates the time at which a potential panel switch is to occur at the UE 106 based on the PSG and/or TTSP included in the upcoming panel switch notification message(s).

If the at least one upcoming panel switch notification message includes a TTSP, then the gNB 102 may determine the time at which the potential panel switch may occur based on the TTSP included therein, which may be in the form of a number of subframes (e.g., 8, 5, 2, etc.). In another example, if the at least one upcoming panel switch notification message includes a PSG (without the TTSP), then the gNB 102 may determine when the potential panel switch may occur based on the PSG included in the at least one upcoming panel switch notification messages from the UE 106. In one example, the gNB 102 may determine when the potential panel switch may occur based on the PSG values included in the three most recent upcoming panel switch notification messages from the UE 106 and the time stamps associated therewith. As mentioned above, the gNB 102 may estimate panel switch timing in any suitable manner, which may be implementation specific. For example, the size of the PSG included in the upcoming panel switch notification message may indicate that the switch between active panels is imminent, and the gNB 102 may utilize a linear interpolation with an extrapolation to intelligence built in the gNB 102 with some predictive filter (Kalman), artificial intelligence (AI), or other known methods, to estimate the panel switch timing.

At step S1010, the gNB 102 sends a CSI-RS with repetition at the appropriate time based on the estimated time at which the panel switch should occur. As mentioned above, the gNB 102 may output the CSI-RS with repetition after the panel switch occurs at the gNB 102. In one example, the gNB 102 may have built-in intelligence that utilizes the feedback from UE 106 to estimate the proper timing of the CSI-RS repetition. In this regard, the gNB 102 may estimate the proper timing for the CSI-RS repetition in any suitable manner.

Figure 13:
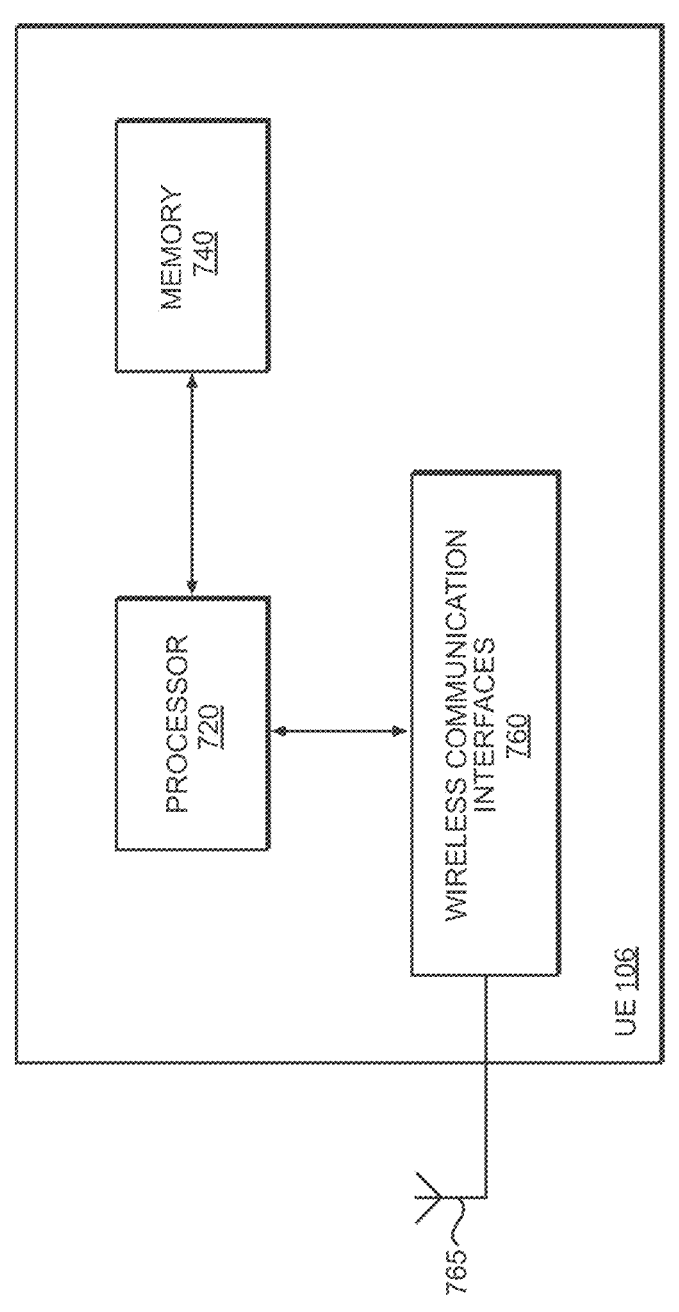
FIG. 13 is a block diagram illustrating an example embodiment of a UE.

FIG. 13 illustrates an example embodiment of the UE 106 shown in FIG. 12.

As shown, the UE 106 includes: a memory 740; a processor 720 connected to the memory 740; various interfaces 760 connected to the processor 720; and one or more (e.g., a plurality of) antennas or antenna panels 765 connected to the various interfaces 760. The various interfaces 760 and the antenna 765 may constitute a transceiver for transmitting/receiving data from/to the gNB 102 via one or more wireless beams or from/to the plurality of TRPs 102A, 102B, 102C, etc. As will be appreciated, depending on the implementation of the UE 106, the UE 106 may include many more components than those shown in FIG. 13. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the UE 106 (e.g., functionalities of a UE, methods according to the example embodiments, etc.) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the antenna 765, or other input/output components. As will be understood, the various interfaces 760 and programs stored in the memory 740 to set forth the special purpose functionalities of the UE 106 will vary depending on the implementation of the UE 106.

The interfaces 760 may also include one or more user input devices (e.g., a keyboard, a keypad, a mouse, or the like) and user output devices (e.g., a display, a speaker, or the like).

Although not specifically discussed herein, the configuration shown in FIG. 13 may be utilized to implement, inter alia, the TRPs 102A, 102B, 102C, the gNB 102, other radio access and backhaul network elements and/or devices. In this regard, for example, the memory 740 may store an operating system and any other routines/modules/applications for providing the functionalities of the TRPs, gNB, etc. (e.g., functionalities of these elements, methods according to the example embodiments, etc.) to be executed by the processor 720.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, eNBs, RRHs, gNBs, femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged, A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUS, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A user equipment comprising:
a plurality of antenna panels;
at least one processor; and
at least one memory storing instructions that, when executed by the at least one processor, cause the user equipment to:
identify a potential change in active antenna panel at the user equipment from a first of the plurality of antenna panels to a second of the plurality of antenna panels, and
transmit at least one early panel switch detection message indicating the potential change in active antenna panel to a base station serving the user equipment,
wherein the at least one memory stores instructions that, when executed by the at least one processor, cause the user equipment to switch the active antenna panel from the first of the plurality of antenna panels to the second of the plurality of antenna panels,
wherein the at least one early panel switch detection message includes:
(i) a difference between a first received signal power for the first of the plurality of
antenna panels and a second received signal power for the second of the plurality of antenna panels,
(ii) an estimated time until the active antenna panel is to switch from the first of the plurality of antenna panels to the second of the plurality of antenna panels,
(iii) an indication of a selected downlink reference signals for the second of the plurality of antenna panels, and
(iv) an indication of a number of transmit beams for the second of the plurality of antenna panels.

2. The user equipment according to claim 1, wherein the at least one memory stores instructions that, when executed by the at least one processor, cause the user equipment to
estimate, based on a received signal block, a difference between a first received signal power for the first of the plurality of antenna panels and a second received signal power for the second of the plurality of antenna panels, and identify the potential change in active antenna panel at the user equipment based on the estimated difference.

3. The user equipment of claim 2, wherein the at least one memory stores instructions that, when executed by the at least one processor, cause the user equipment to identify the potential change in active antenna panel at the user equipment in response to the estimated difference being less than a panel switch threshold value.

4. The user equipment of claim 2, wherein the at least one memory stores instructions that, when executed by the at least one processor, cause the user equipment to
determine that the estimated difference is less than a panel switch threshold value, and
calculate a panel switch delay in response to determining that the estimated difference is less than the panel switch threshold value,
wherein
the at least one early panel switch detection message includes the panel switch delay.

5. The user equipment according to claim 1, wherein the at least one early panel switch detection message is transmitted via L1 signaling or L2 signaling.

6. The user equipment of claim 5, wherein the at least one early panel switch detection message is at least one Physical Uplink Shared Channel message.

7. The user equipment of claim 6, wherein the at least one Physical Uplink Shared Channel message includes:
an Uplink Control Information (UCI) message transmitted via L1 signaling, and
a MAC control element transmitted via L2 signaling, wherein for the L2 signaling, a payload of an upcoming panel switch notification message comprises a 2-field container designed to include a panel switch gap and a slot_offset/subframe_offset and wherein a device ID is implicit by having dedicated uplink resources to carry the signaling or included in the payload.

8. The user equipment of claim 5, wherein the at least one early panel switch detection message includes an Uplink Control Information (UCI) message transmitted on a Physical Uplink Control Channel via L1 signaling.

9. The user equipment according to claim 1, wherein the at least one memory stores instructions that, when executed by the at least one processor, cause the user equipment to
transmit a scheduling request for transmitting the at least one early panel switch detection message, and
transmit the at least one early panel switch detection message in response to a scheduling grant sent in response to the scheduling request.

10. The user equipment according to claim 1, wherein the at least one memory stores instructions that, when executed by the at least one processor, cause the user equipment to periodically transmit the at least one early panel switch detection message, each early panel switch detection message including at least (i) a difference between a first received signal power for the first of the plurality of antenna panels and a second received signal power for the second of the plurality of antenna panels, and (ii) an estimated time until the active antenna panel is to change from the first of the plurality of antenna panels to the second of the plurality of antenna panels.

11. The user equipment of claim 1, wherein at least two of the plurality of antenna panels are active simultaneously.

12. A method comprising:
identifying, by a user equipment, a potential change in active antenna panel at the user equipment from a first of a plurality of antenna panels to a second of the plurality of antenna panels; and transmitting at least one early panel switch detection message indicating the potential change in active antenna panel to a base station serving the user equipment, the method further comprising:

switching the active antenna panel from the first of the plurality of antenna panels to the second of the plurality of antenna panels, wherein the at least one early panel switch detection message includes:

(i) a difference between a first received signal power for the first of the plurality of antenna panels and a second received signal power for the second of the plurality of antenna panels, (ii) an estimated time until the active antenna panel is to switch from the first of the plurality of antenna panels to the second of the plurality of antenna panels, (iii) an indication of a selected downlink reference signals for the second of the plurality of antenna panels, and (iv) an indication of a number of transmit beams for the second of the plurality of antenna panels.

13. A radio access network element comprising: at least one processor; and at least one memory storing instructions that, when executed by the at least one processor, cause the radio access network element to:

receive at least one early panel switch detection message indicating a potential upcoming change in active antenna panel at a user equipment from a first antenna panel to a second antenna panel, and transmit a reference signal with repetition to the user equipment based on the received at least one early panel switch detection message, wherein the at least one early panel switch detection message includes:

a difference between a first received signal power for the first antenna panel and a second received signal power for the second antenna panel, an estimated time until the active antenna panel is to change from the first antenna panel to the second antenna panel, an indication of a selected downlink reference signals for the second antenna panel at the radio access network element, and an indication of a number of transmit beams for the second antenna panel.

14. The radio access network element according to claim 13, wherein the at least one early panel switch detection message is received via L1 signaling or L2 signaling.

15. The radio access network element of claim 14, wherein the at least one early panel switch detection message comprises:

at least one Uplink Control Information (UCI) messages transmitted on a Physical Uplink Shared Channel or a Physical Uplink Control Channel via L1 signaling, and at least one MAC control element transmitted on the Physical Uplink Shared Channel via L2 signaling.

16. The radio access network element according to claim 13, wherein the at least one memory stores instructions that, when executed by the at least one processor, cause the radio access network element to transmit a scheduling grant in response to a scheduling request for transmitting the at least one early panel switch detection message.

17. The radio access network element according to claim 13, wherein the at least one memory stores instructions that, when executed by the at least one processor, cause the radio access network element to determine an estimated time at which the active antenna panel is to change from the first antenna panel to the second antenna panel based on the at least one early panel switch detection message, and transmit the reference signal with repetition based on the estimated time.

18. The radio access network element of claim 17, wherein the at least one early panel switch detection message include a plurality of early panel switch detection messages, and the at least one memory stores instructions that, when executed by at least one processor, cause the radio access network element to determine the estimated time at which the active antenna panel is to change from the first antenna panel to the second antenna panel based on the plurality of early panel switch detection messages.

* * * * *